United States Patent
Park et al.

(10) Patent No.: US 8,881,041 B2
(45) Date of Patent: Nov. 4, 2014

(54) METHOD AND APPARATUS FOR PROVIDING UI ANIMATION

(75) Inventors: In-cheol Park, Incheon (KR); Min-kyu Park, Seoul (KR); Young-il Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 12/794,176

(22) Filed: Jun. 4, 2010

(65) Prior Publication Data

US 2011/0099492 A1    Apr. 28, 2011

(30) Foreign Application Priority Data

Oct. 26, 2009  (KR) .................. 10-2009-0101737

(51) Int. Cl.
G06F 3/048       (2013.01)
G06F 3/0481      (2013.01)
G06F 3/0482      (2013.01)

(52) U.S. Cl.
CPC .......... G06F 3/04815 (2013.01); G06F 3/0481 (2013.01); G06F 3/0482 (2013.01)
USPC .......................................... 715/764; 715/765

(58) Field of Classification Search
CPC ...................................................... G06F 3/0481
USPC .................................................. 715/764, 765
See application file for complete search history.

(56) References Cited

U.S. PATENT DOCUMENTS

| | | | | |
|---|---|---|---|---|
| 5,261,041 A | * | 11/1993 | Susman | 345/473 |
| 5,966,131 A | * | 10/1999 | Marks | 345/418 |
| 7,173,624 B2 | * | 2/2007 | Minakuchi | 345/473 |
| 8,228,336 B1 | * | 7/2012 | Dykes | 345/473 |
| 2004/0012607 A1 | * | 1/2004 | Witt | 345/592 |
| 2004/0100470 A1 | * | 5/2004 | Minakuchi | 345/473 |
| 2004/0160445 A1 | * | 8/2004 | Whatmough | 345/473 |
| 2005/0062888 A1 | * | 3/2005 | Wood et al. | 348/553 |
| 2006/0055700 A1 | * | 3/2006 | Niles et al. | 345/473 |
| 2006/0125799 A1 | * | 6/2006 | Hillis et al. | 345/173 |
| 2009/0122018 A1 | * | 5/2009 | Vymenets et al. | 345/173 |
| 2009/0307623 A1 | * | 12/2009 | Agarawala et al. | 715/765 |
| 2010/0124242 A1 | * | 5/2010 | He | 370/515 |

FOREIGN PATENT DOCUMENTS

| | | |
|---|---|---|
| CN | 1259701 A | 7/2000 |
| JP | 2000-181675 A | 6/2000 |

OTHER PUBLICATIONS

Communication, dated Jul. 31, 2014, issue by the State Intellectual Property Office of P.R. China in counterpart Patent Application No. 201010516341.6.

* cited by examiner

*Primary Examiner* — William Bashore
*Assistant Examiner* — Gregory A Distefano
(74) *Attorney, Agent, or Firm* — Sughrue Mion, PLLC

(57) ABSTRACT

A method and apparatus for translating between an object displayed in a first mode of a user interface (UI) and a second mode of the UI. The method includes determining a current UI mode from among UI modes, which include a physics animation mode and a non-physics animation mode, and determining an animation type of the current UI mode; extracting current UI information, associated with the animation type of the current UI mode, of a UI object; translating the current UI information of the UI object to translation UI information of the UI object associated with the animation type of another UI mode among the UI modes; and storing the translation UI information.

29 Claims, 6 Drawing Sheets

METHOD AND APPARATUS FOR PROVIDING UI ANIMATION

CROSS-REFERENCE TO RELATED PATENT APPLICATION

This application claims priority from Korean Patent Application No. 10-2009-0101737, filed on Oct. 26, 2009, in the Korean Intellectual Property Office, the disclosure of which is incorporated herein by reference in its entirety.

BACKGROUND

1. Field

The present disclosure relates to a method and apparatus for providing a user interface (UI) animation, and more particularly, to a method and apparatus for translating between an animation, to which physical rules are applied (hereinafter, referred to as 'physics animation'), and an animation, to which physical rules are not applied (hereinafter, referred to as 'non-physics animation'), and/or simultaneously displaying both the physics animation and the non-physics animation.

2. Description of the Related Art

Various techniques have been developed to enhance user experience when users use an application. For example, one of the various techniques is to apply an animation to a user interface. In particular, various attempts have been made to apply physical rules to UI animations. In such animations, to which physical rules are applied, it is possible to realistically and naturally represent a UI, but it is difficult to sufficiently control a plurality of UI objects in order to represent a desired UI animation.

That is, it is very difficult to reflect the location or state of each of UI objects based on physical rules in order to represent a desired UI animation. Even if the location and/or state of each of the UI objects are reflected based on physical rules, computational complexity increases, thus degrading system performance. Thus, when a UI animation is considered in terms of efficiency and aspects of realistic and natural representation, the UI animation should be divided into physical elements and non-physical elements. A physical element may coexist with a non-physical element, and translating between a physical element and a non-physical element should be performed naturally, if needed.

SUMMARY

The present disclosure provides a method and apparatus for translating between a physics animation and a non-physics animation and/or simultaneously displaying both the physics animation and the non-physics animation.

The present disclosure also provides a computer readable recording medium having recorded thereon a computer program for executing the above method.

According to an exemplary embodiment, there is disclosed a method of providing a user interface (UI) animation, the method including determining a current UI mode from among a plurality of UI modes, the plurality of UI modes comprising a physics animation mode and a non-physics animation mode, and determining an animation type of the current UI mode; extracting current UI information, associated with the animation type of the current UI mode, of a UI object; translating the current UI information of the UI object to translation UI information of the UI object associated with the animation type of another UI mode among the plurality of UI modes; and storing the translation UI information.

The method may further include extracting UI information to display the UI object in the physics animation mode; and extracting UI information to display the UI object in the non-physics animation mode.

The method may further include displaying the UI object on a display.

If the current UI mode is the non-physics animation mode, the animation type may include at least one of a translation type, a rotation type, a scale type, an alpha variation type, and a shape modification type. If the current UI mode is the physics animation mode, the animation type may include at least one of the alpha variation type and the shape modification type.

If the current UI mode is the non-physics animation mode and the animation type is the translation type, the extracting of the current UI information comprises extracting non-physical UI elements, the non-physical UI elements comprising a location and a time when the UI object starts to move and a location and time when the UI object stops moving, and the translating comprises translating the current UI information to physical UI elements, the physical UI elements comprising a force, an acceleration, a linear velocity, and a motion vector of the UI object.

If the current UI mode is the non-physics animation mode and the animation type is the rotation type, the extracting of the current UI information comprises extracting non-physical UI elements, the non-physical UI elements comprising an angle of rotation of the UI object per unit time, and the translating comprises translating the current UI information to physical UI elements, the physical UI elements comprising a torque, an angular velocity, and a motion vector of the UI object.

If the current UI mode is the non-physics animation mode and the animation type is the scale type, the extracting of the current UI information comprises extracting non-physical elements, the non-physical UI elements comprising a variation in size of the UI object, and the translating comprises translating the current UI information to physical UI elements, the physical UI elements comprising a mass and a collision shape of the UI object.

If the current UI mode is the non-physics animation mode and the animation type is the alpha variation type, the extracting of the current UI information comprises extracting non-physical elements, the non-physical UI elements comprising a transparency, a location, and a size of the UI object, and the translating to the translation UI information comprises translating the current UI information to physical UI elements, the physical UI elements comprising whether the UI object is visible, a location, a mass, and a collision shape of the UI object.

If the current UI mode is the non-physics animation mode and the animation type is the shape modification type, the extracting of the current UI information comprises extracting non-physical elements, the non-physical UI elements comprising a shape of the UI object, a location and a time when the UI object starts to move, and a location and a time when the UI object stops moving, and the translating comprises translating the current UI information to physical UI elements, the physical UI elements comprising a shape, a linear velocity, and a motion vector of the UI object.

If the current UI mode is the physics animation mode and the animation type is the alpha variation type, the extracting of the current UI information comprises extracting physical UI elements, the physical UI elements comprising whether the UI object is visible, a location, and mass of the UI object, and the translating comprises translating the current UI information to non-physical elements, the non-physical UI elements comprising a transparency, a location, and a size of the UI object.

If the current UI mode is the physics animation mode and the animation type is the shape modification type, the extracting of the current UI information comprises extracting physical UI elements, the physical UI elements comprising a shape of the UI object and an intensity and a direction of force applied to the UI object, and the translating comprises translating the current UI information to non-physical UI elements, the non-physical UI elements comprising an initial shape and a location where the UI object is motionless.

The initial shape of the UI object when the UI object is motionless may include a modification to the UI object or pieces of the UI object when the UI object is broken.

According to another exemplary embodiment, there is provided a computer readable recording medium having recorded thereon a computer program for executing the method.

According to another exemplary embodiment, there is provided an apparatus for providing a user interface (UI) animation, the apparatus including a determination unit that determines a current UI mode from among a plurality of UI modes, the plurality of UI modes comprising a physics animation mode and a non-physics animation mode, and that determines an animation type of the current UI mode; a UI information extraction unit for extracting current UI information, associated with the animation type of the current UI mode, of a UI object; a UI information translation unit that translates the current UI information of the UI object to translation UI information of the UI object associated with the animation type of another UI mode among the plurality of UI modes; and a storage unit that stores the translation UI information.

BRIEF DESCRIPTION OF THE DRAWINGS

The above and/or other features and advantages of the present disclosure will become more apparent by describing in detail exemplary embodiments thereof with reference to the attached drawings in which.

DETAILED DESCRIPTION

Figure 1:
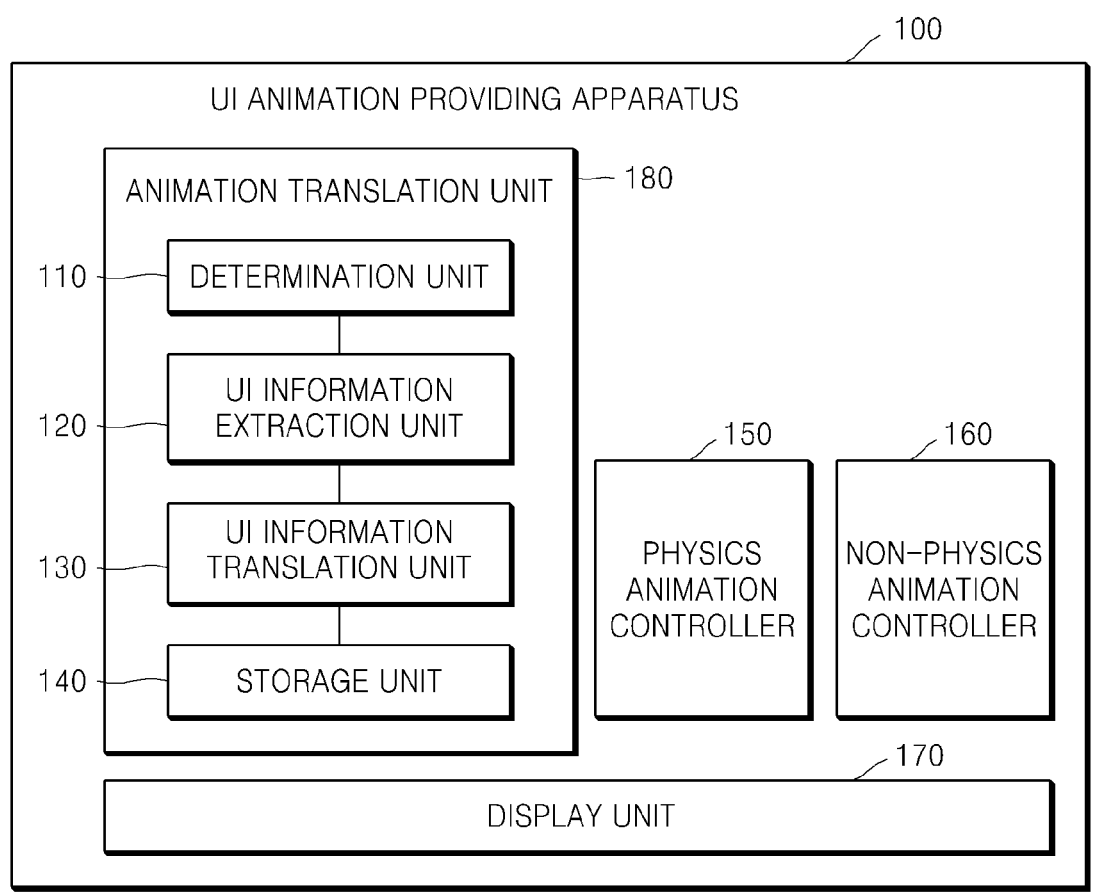
FIG. 1 is a schematic diagram of a user interface (UI) animation providing apparatus according to an exemplary embodiment.

Hereinafter, exemplary embodiments will be described in detail with reference to the accompanying drawings. Like reference numerals denote like elements throughout the drawings. In the drawings, the size of each element may be exaggerated for clarity. Expressions such as "at least one of," when preceding a list of elements, modify the entire list of elements and do not modify the individual elements of the list.

FIG. 1 is a schematic diagram of a user interface (UI) animation providing apparatus 100 according to an exemplary embodiment. The UI animation providing apparatus 100 includes an animation translation unit 180, a physics animation controller 150, a non-physics animation controller 160, and a display unit 170.

The physics animation controller 150 extracts a plurality of pieces of UI information, which are needed to express a physics animation mode from among a plurality of UI modes, from a UI object. The pieces of UI information needed to express the physics animation mode include information about gravity, force, torque, angular velocity, linear velocity, friction, restitution, damping, inertia, impulse, and mass. The pieces of UI information influence the UI object and may be used to calculate the motion of the UI object or to calculate an interoperation of the UI object, such as a collision between the UI object and another UI object.

The non-physics animation controller 160 extracts a plurality of pieces of UI information, which are needed to express a non-physics animation mode from among the plurality of UI modes, from a UI object. Animation types of non-physics animation mode include a translation type, a rotation type, a scale type, an alpha variation type, and a shape modification type (shape modification).

For a natural translation between a physics animation and a non-physics animation, the animation translation unit 180 extracts translation UI information associated with a plurality of pieces of UI information, which are needed to express the animation in the physics animation mode and the non-physics animation mode, and reflects the translation UI information into the UI object.

Specifically, the animation translation unit 180 includes a determination unit 110, a UI information extraction unit 120, a UI information translation unit 130, and a storage unit 140.

The determination unit 110 determines a current UI mode from among the plurality of UI modes that include the physics animation mode and the non-physics animation mode, and determines an animation type of the current UI mode.

The UI information extraction unit 120 extracts current UI information of a UI object for expressing the animation type of the current UI mode.

The UI information translation unit 130 translates the current UI information to the translation UI information in order to translate the current UI mode to another animation mode.

The storage unit 140 stores the translation UI information of the UI object.

The display unit 170 displays at least one UI object. The display unit 170 may simultaneously display UI objects corresponding to the non-physics animation mode and UI objects corresponding to the physics animation mode.

According to an exemplary embodiment, for performing a translation between a physics animation and a non-physics animation, operating elements of the physics animation and the non-physics animation may be effectively matched with each other to realistically and naturally display a UI animation.

According to an exemplary embodiment, a physics animation and a non-physics animation may be simultaneously displayed, thereby achieving the advantages of both the non-physics animation, the UI objects that can be easily controlled, and the physics animation, which allows video to be realistically and naturally displayed.

Figure 2:
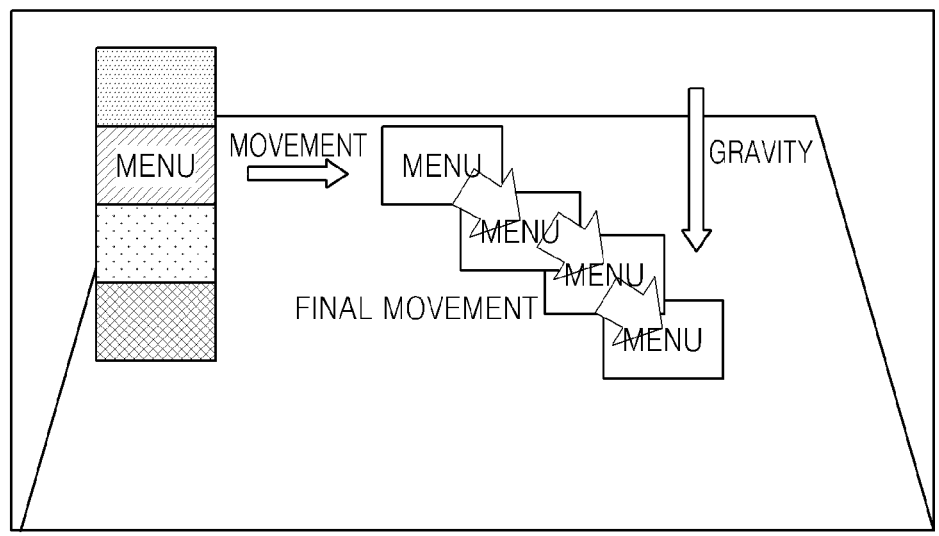
FIG. 2 illustrates translating from a translation animation type to a physics animation according to an exemplary embodiment.

FIG. 2 illustrates translating from a translation animation type to a physics animation according to an exemplary embodiment. In the case of the translation animation type, the UI animation providing apparatus 100 of FIG. 1 extracts information regarding a UI object displayed as the non-physics animation, e.g., a starting location and time when the UI object starts to move and a target location and time when the movement of the UI object ends. The UI animation providing apparatus 100 calculates the force, acceleration, linear velocity, and a motion vector of the UI object, based on the extracted information and applies physical rules to the UI object according to the calculation results, thereby enabling the non-physics animation to be naturally translated to the physics animation.

Figure 3:
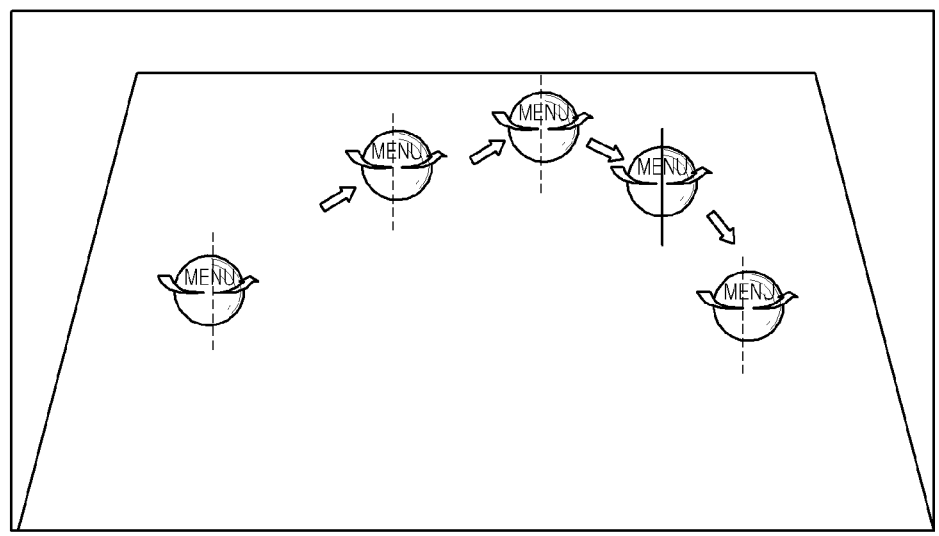
FIG. 3 illustrates translating from a rotation animation type to a physics animation according to an exemplary embodiment.

FIG. 3 illustrates translating from a rotation animation type to a physics animation according to an exemplary embodiment. In the case of the rotation animation type, the UI animation providing apparatus 100 of FIG. 1 extracts information regarding a UI object displayed as the non-physics animation, e.g., an angle of rotation per unit time, etc. The UI animation providing apparatus 100 calculates the torque, angular velocity, and a motion vector of the UI object based on the extracted information, and applies physical rules to the UI object according to the calculation results, thereby enabling the non-physics animation to be naturally translated to the physics animation.

Figure 4:
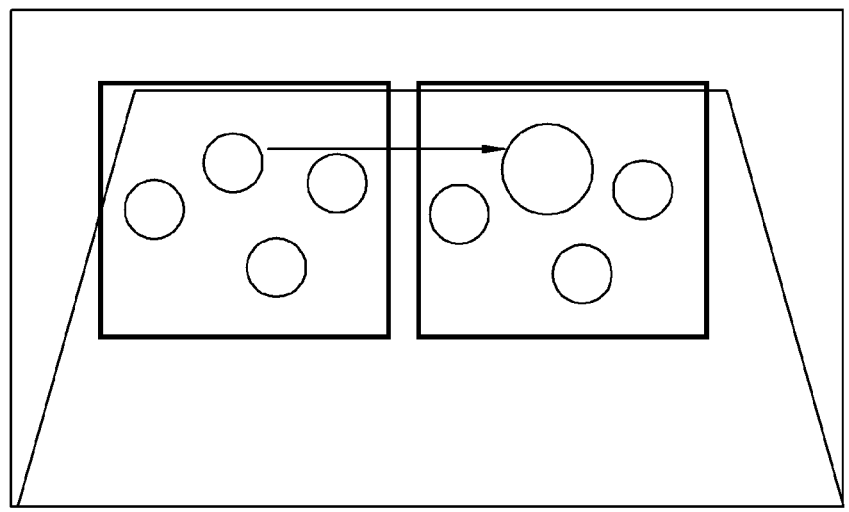
FIG. 4 illustrates translating from a scale animation type to a physics animation according to an exemplary embodiment.

FIG. 4 illustrates translating from a scale animation type to a physics animation according to an exemplary embodiment. In the case of the scale animation type, the UI animation providing apparatus 100 of FIG. 1 extracts information regarding a UI object displayed as the non-physics animation, e.g., a variation in the size of the UI object. The UI animation providing apparatus 100 calculates the mass of the UI object based on the extracted information, and applies physical rules to the UI object according to the calculation result, thereby enabling the non-physics animation to be naturally translated to the physics animation.

The motion and rotational movement of the UI object are influenced by the mass thereof. When the UI object collides with another UI object, the degree of impact and collision shape that influence the other UI object depend on the mass of the UI object. If, during a translation from the non-physics animation to the physics animation, a variation in the size of the UI object is reflected without reflecting the mass of the UI object, then the non-physics animation cannot be naturally translated to the physics animation. If not only the UI object's mass and variation in size but friction and inertia are also reflected, the non-physics animation may be more naturally translated to the physics animation.

Figure 5:
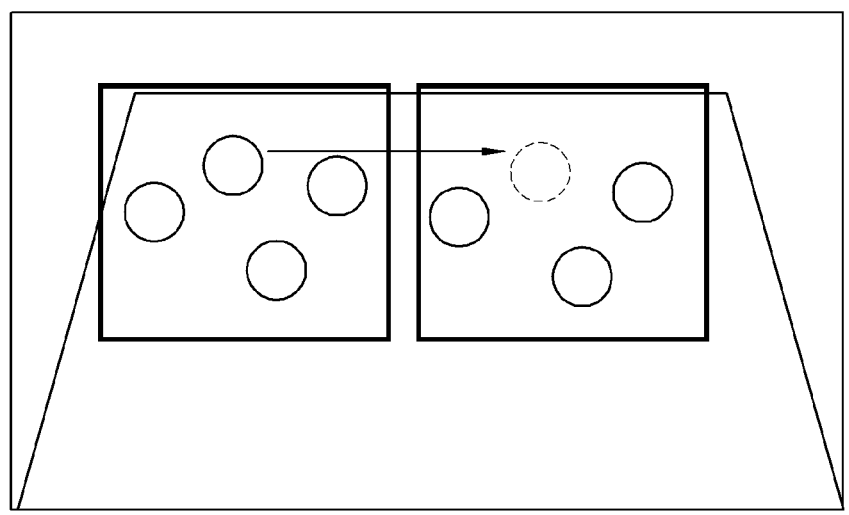
FIG. 5 illustrates translating from an alpha variation animation type to a physics animation according to an exemplary embodiment.

FIG. 5 illustrates translating from an alpha variation animation type to a physics animation according to an exemplary embodiment. In the case of the alpha variation animation type, the UI animation providing apparatus 100 of FIG. 1 extracts information regarding a UI object displayed as the non-physics animation, e.g., transparency, location, and size thereof. The UI animation providing apparatus 100 calculates whether the UI object is visible, the location, mass, and collision shape of the UI object based on the extracted information, and applies physical rules to the UI object, thereby enabling the non-physics animation to be naturally translated to the physics animation.

If the UI object displayed as the non-physics animation is transparent, the UI object should not be displayed in the world of physics animation. If the displayed UI object is opaque, the UI object should be displayed in the world of physics animation.

In an exemplary embodiment, although not shown, the non-physics animation may be translated to a shape modification type physics animation, in which a plurality of UI objects are combined and displayed as one UI object. In the case of the shape modification type physics animation, the UI animation providing apparatus 100 combines a plurality of UI objects into one object, and applies physical rules to the combination result, thereby enabling the non-physics animation to be naturally translated to the physics animation.

Figure 6:
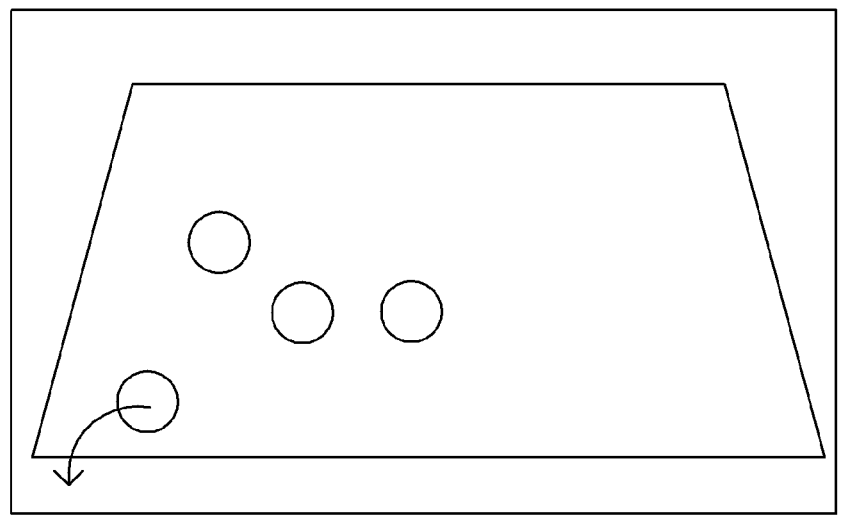
FIG. 6 illustrates translating from an alpha variation animation type to a non-physics animation according to an exemplary embodiment.

FIG. 6 illustrates translating from an alpha variation animation type to a non-physics animation according to an exemplary embodiment. In the case of the alpha variation animation type, the UI animation providing apparatus 100 of FIG. 1 extracts information regarding a UI object displayed as the physics animation, e.g., whether the UI object is visible, and the location and mass of the UI object. The UI animation providing apparatus 100 calculates the transparency, location, and size of the UI object based on the extracted information, thereby enabling the physics animation to be naturally translated to the non-physics animation.

A UI object that is not displayed in the world of physics animation is processed to be transparent in the non-physics animation, and is thus not displayed on a screen. A UI object displayed in the world of physics animation is processed to be opaque in the non-physics animation, and is thus displayed on the screen.

Figure 7:
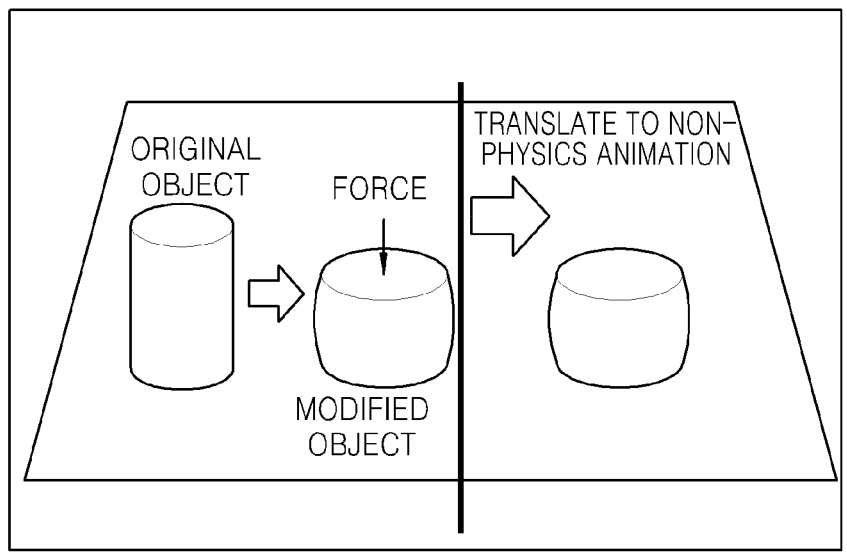
FIG. 7 illustrates translating from a shape modification animation type to a non-physics animation according to an exemplary embodiment.

FIG. 7 illustrates translating from a shape modification animation type to a non-physics animation according to an exemplary embodiment. In the case of the shape modification animation type, the UI animation providing apparatus 100 of FIG. 1 extracts information regarding a UI object displayed as the physics animation, e.g., the shape of the UI object and the intensity and direction of force applied to the UI object. The UI animation providing apparatus 100 extracts information regarding the UI object, e.g., the initial shape and location of the UI object when the UI object is motionless based on the extracted information, thereby enabling the physics animation to be naturally translated to the non-physics animation.

Figure 8:
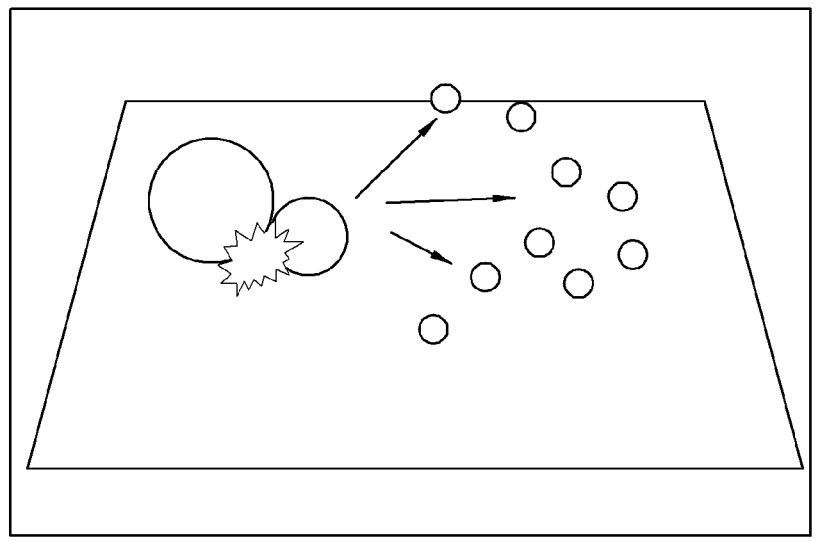
FIG. 8 illustrates translating from a broken shape modification animation type to a non-physics animation according to an exemplary embodiment.

FIG. 8 illustrates translating from a broken shape modification animation type to a non-physics animation according to an exemplary embodiment. In the case of the broken shape modification animation type, if a UI object collides against another UI object or force is applied to the UI object, then the UI object is broken into several pieces, thereby translating the physics animation to the non-physics animation. The UI animation providing apparatus 100 of FIG. 1 extracts a UI object displayed as the physics animation, e.g., the shape of the UI object and the intensity and direction of force applied to the UI object. The UI animation providing apparatus 100 calculates the initial shape and location of the pieces of the broken UI object when the UI object is motionless based on the extracted information, thereby enabling the physics animation to be naturally translated to the non-physics animation.

Figure 9:
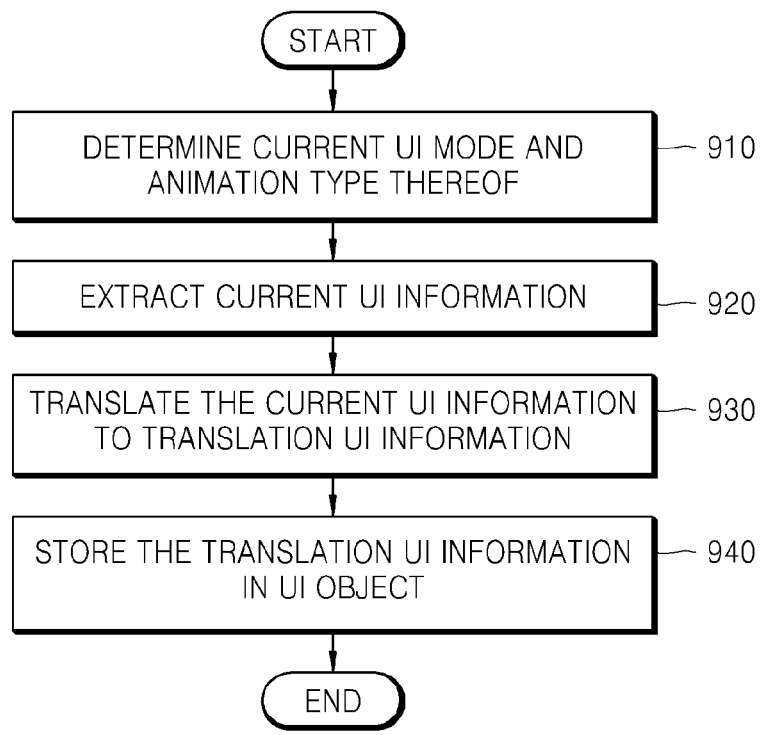
FIG. 9 is a flowchart illustrating a method of translating between the physics animation and the non-physics animation according to an exemplary embodiment.

FIG. 9 is a flowchart illustrating a method of translating between the physics animation and the non-physics animation according to an exemplary embodiment. Referring to FIG. 9, in operation 910, a current UI mode is determined from among a plurality of UI modes that include a physics animation mode a non-physics animation mode, and the animation type of the current UI mode is determined. If the current UI mode is the non-physics animation mode, then the animation type may be at least one of the translation type, the rotation type, the scale type, the alpha variation type, and the shape modification type. If the current UI mode is the physics animation mode, then the animation type may be at least one of the alpha variation type and the shape modification type.

In operation 920, current UI information is extracted from a UI object representing the animation type of the current UI mode.

If it is determined in operation 910 that the current UI mode is the non-physics animation mode and the animation type thereof is the translation type, then information regarding the UI object, e.g., the location and time when the UI object starts to move and the location and time when the movement of the UI object ends, is extracted, in operation 920.

If it is determined in operation 910 that the current UI mode is the non-physics animation mode and the animation type thereof is the rotation type, then information regarding the UI object, e.g., an angle of rotation per unit time, is extracted in operation 920.

If it is determined in operation 910 that the current UI mode is the non-physics animation mode and the animation type thereof is the scale type, then information regarding the UI object, e.g., a variation in the size of the UI object, is extracted in operation 920.

If it is determined in operation 910 that the current UI mode is the non-physics animation mode and the animation type thereof is the alpha variation type, then information regarding the UI object, e.g., the transparency, location, and size of the UI object, is extracted in operation 920.

If it is determined in operation 910 that the current UI mode is the non-physics animation mode and the animation type thereof is the shape modification type, then information regarding the UI object, e.g., the shape of the UI object, the location and time when the UI object starts to move, and the location and time when the movement of the UI object ends, are extracted in operation 920.

If it is determined in operation 910 that the current UI mode is the physics animation mode and the animation type thereof is the alpha variation type, information regarding the UI object, e.g., whether the UI object is visible and the location and mass of the UI object, is extracted in operation 920.

If it is determined in operation 910 that the current UI mode is the physics animation mode and the animation type thereof is the shape modification type, then information regarding the UI object, e.g., the shape of the UI object and the intensity and direction of force applied to the UI object, is extracted in operation 920.

In operation 930, to translate from the current UI mode to another animation mode, the current UI information is translated to translation UI information of the UI object.

If it is determined in operation 910 that the current UI mode is the non-physics animation mode and the animation type thereof is the translation type, then the current UI information is translated to translation UI information, e.g., the force, acceleration and motion vector of the UI object, in operation 930.

If it is determined in operation 910 that the current UI mode is the non-physics animation mode and the animation type thereof is the rotation type, then the current UI information is translated to translation UI information, e.g., the torque, angular velocity, and motion vector of the UI object, in operation 930.

If it is determined in operation 910 that the current UI mode is the non-physics animation mode and the animation type thereof is the scale type, then the current UI information is translated to translation UI information, e.g., the mass and collision shape of the UI object, in operation 930.

If it is determined in operation 910 that the current UI mode is the non-physics animation mode and the animation type thereof is the alpha variation type, then the current UI information is translated to translation UI information, e.g., whether the UI object is visible and the location, mass, and collision shape of the UI object, in operation 930.

If it is determined in operation 910 that the current UI mode is the non-physics animation mode and the animation type thereof is the shape modification type, then the current UI information is translated to translation UI information, e.g., the shape, linear velocity, and motion vector of the UI object, in operation 930.

If it is determined in operation 910 that the current UI mode is the physics animation mode and the animation type thereof is the alpha variation type, then the current UI information is translated to translation UI information, e.g., the transparency, location, and size of the UI object, in operation 930.

If it is determined in operation 910 that the current UI mode is the physics animation mode and the animation type thereof is the shape modification type, then the current UI information is translated to translation UI information, e.g., the initial shape and location when the UI object is motionless, in operation 930. The initial shape of the UI object when it is motionless may be a modification to the UI object or pieces of the UI object when it is broken.

In operation 940, the translation UI information is stored.

Figure 10A:
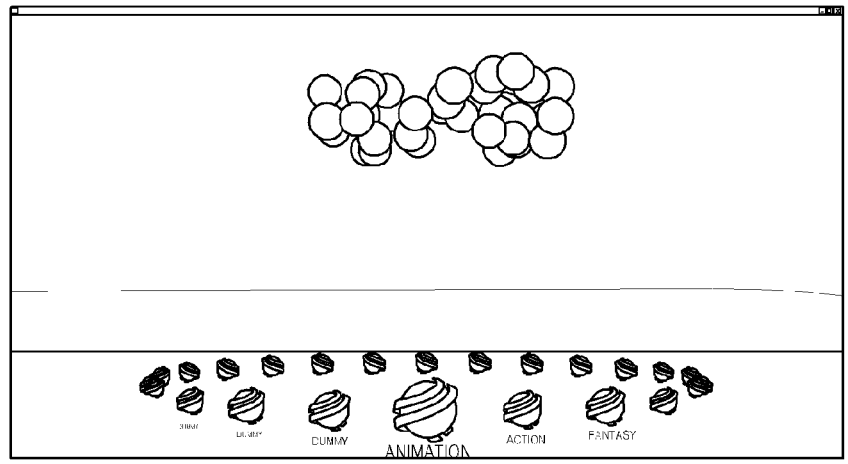
FIGS. 10A to 10C illustrate a case where the physics animation and the non-physics animation are represented simultaneously, according to an exemplary embodiment.
Figure 10B:
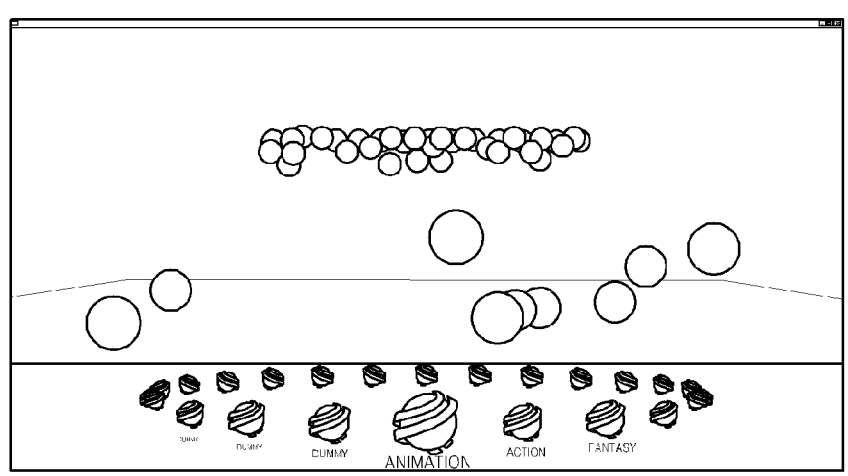
Figure 10C:
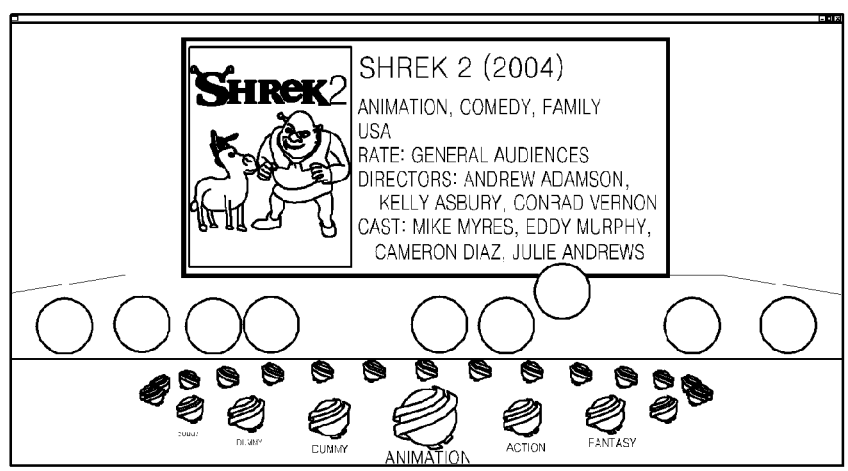

FIGS. 10A to 10C illustrate a case where the physics animation and the non-physics animation are simultaneously displayed, according to an exemplary embodiment. In detail, FIG. 10A illustrates an initial screen of a preferred UI program, according to an exemplary embodiment.

Referring to FIG. 10B, if an application user selects an "animation" item from among menu items, a plurality of program objects corresponding to the "animation" item are displayed as physics animations. Physical rules are applied to the program objects, and thus the program objects are displayed as animations that are rolling downward or forward on a screen.

FIG. 10C illustrates a screen in which details of an animation program, e.g., "Shrek", which the application user selects when preferred programs are located forward, on the screen of FIG. 10B, according to an exemplary embodiment. In this case, the details of the animation program are displayed as non-physics animations. The details of the animation program appear gradually as non-physics animations, and the program objects illustrated in FIG. 10B are still displayed as physics animations.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

For example, the UI animation providing apparatus 100 according to an exemplary embodiment may further include a bus coupled to the elements illustrated in FIG. 1 and at least one central processing unit (CPU) coupled to the bus. The UI animation providing apparatus 100 may further include a memory unit that is coupled to the bus and stores a command, a received message, or a generated message, and that is also coupled to the at least one processor so that the above commands may be performed.

The exemplary embodiments may be embodied as computer readable code stored in a computer readable medium. Here, the computer readable medium may be any recording medium capable of storing data that is read by a computer system, e.g., a read-only memory (ROM), a random access memory (RAM), a compact disc (CD)-ROM, a magnetic tape, a floppy disk, an optical data storage device, and so on. The computer readable medium can be distributed among computer systems that are interconnected through a network, and the present invention may be stored and implemented as computer readable code in the distributed system.

What is claimed is:

1. A method of providing a user interface (UI) animation, the method comprising:
   determining a current UI mode from among a plurality of UI modes, the plurality of UI modes comprising a physics animation mode and a non-physics animation mode, and determining an animation type of the current UI mode;
   extracting current UI information, associated with the animation type of the current UI mode, of a UI object, the current UI information of the UI object comprising at least one property of the UI object for displaying the UI object according to the animation type of the current UI mode;
   translating the at least one property of the UI object of the current UI information of the UI object to at least one other property of the UI object of translation UI information of the UI object associated with the animation type of another UI mode among the plurality of UI modes, the at least one other property of the UI object for displaying the UI object according to the animation type of the another UI mode;
   storing the translation UI information: and
   displaying the UI object based on the stored translation UI information after the UI mode is translated.

2. The method of claim 1, further comprising:
   extracting UI information to display the UI object in the physics animation mode; and
   extracting UI information to display the UI object in the non-physics animation mode.

3. The method of claim 1, wherein, if the current UI mode is the non-physics animation mode, the animation type comprises at least one of a translation type, a rotation type, a scale type, an alpha variation type, and a shape modification type, and
   if the current UI mode is the physics animation mode, the animation type comprises at least one of the alpha variation type and the shape modification type.

4. The method of claim 3, wherein, if the current UI mode is the non-physics animation mode and the animation type is the translation type, the at least one property comprises non-physical UI elements and the extracting of the current UI information comprises extracting the non-physical UI elements, the non-physical UI elements comprising a location and a time when the UI object starts to move and a location and time when the UI object stops moving, and
   the translating comprises translating the current UI information to physical UI elements, the physical UI elements comprising a force, an acceleration, a linear velocity, and a motion vector of the UI object.

5. The method of claim 3, wherein, if the current UI mode is the non-physics animation mode and the animation type is the rotation type, the at least one property comprises non-physical UI elements and the extracting of the current UI information comprises extracting the non-physical UI elements, the non-physical UI elements comprising an angle of rotation of the UI object per unit time, and
   the translating comprises translating the current UI information to physical UI elements, the physical UI elements comprising a torque, an angular velocity, and a motion vector of the UI object.

6. The method of claim 3, wherein, if the current UI mode is the non-physics animation mode and the animation type is the scale type, the at least one property comprises non-physical UI elements and the extracting of the current UI information comprises extracting the non-physical UI elements, the non-physical UI elements comprising a variation in size of the UI object, and
   the translating comprises translating the current UI information to physical UI elements, the physical UI elements comprising a mass and a collision shape of the UI object.

7. The method of claim 3, wherein, if the current UI mode is the non-physics animation mode and the animation type is the alpha variation type, the at least one property comprises non-physical UI elements and the extracting of the current UI information comprises extracting the non-physical UI elements, the non-physical UI elements comprising a transparency, a location, and a size of the UI object, and
   the translating to the translation UI information comprises translating the current UI information to physical UI elements, the physical UI elements comprising whether the UI object is visible, a location, a mass, and a collision shape of the UI object.

8. The method of claim 3, wherein, if the current UI mode is the non-physics animation mode and the animation type is the shape modification type, the at least one property comprises non-physical UI elements and the extracting of the current UI information comprises extracting the non-physical UI elements, the non-physical UI elements comprising a shape of the UI object, a location and a time when the UI object starts to move, and a location and a time when the UI object stops moving, and
   the translating comprises translating the current UI information to physical UI elements, the physical UI elements comprising a shape, a linear velocity, and a motion vector of the UI object.

9. The method of claim 3, wherein, if the current UI mode is the physics animation mode and the animation type is the alpha variation type, the at least one property comprises physical UI elements and the extracting of the current UI information comprises extracting the physical UI elements, the physical UI elements comprising whether the UI object is visible, a location, and mass of the UI object, and
   the translating comprises translating the current UI information to non-physical elements, the non-physical UI elements comprising a transparency, a location, and a size of the UI object.

10. The method of claim 3, wherein, if the current UI mode is the physics animation mode and the animation type is the shape modification type, the at least one property comprises physical UI elements and the extracting of the current UI information comprises extracting the physical UI elements, the physical UI elements comprising a shape of the UI object and an intensity and a direction of force applied to the UI object, and
    the translating comprises translating the current UI information to non-physical UI elements, the non-physical UI elements comprising an initial shape and a location where the UI object is motionless.

11. The method of claim 10, wherein the initial shape of the UI object when the UI object is motionless comprises a modification to the UI object or pieces of the UI object when the UI object is broken.

12. A non-transitory computer readable recording medium having recorded thereon a computer program, which when executed by the computer, causes the computer to execute the method of claim 1.

13. An apparatus for providing a user interface (UI) animation, the apparatus comprising:
a processor configured to implement:
a determination unit that determines a current UI mode from among a plurality of UI modes, the plurality of UI modes comprising a physics animation mode and a non-physics animation mode, and that determines an animation type of the current UI mode;
a UI information extraction unit for extracting current UI information, associated with the animation type of the current UI mode, of a UI object, the current UI information of the UI object comprising at least one property of the UI object for displaying the UI object according to the animation type of the current UI mode;
a UI information translation unit that translates the at least one property of the UI object of the current UI information of the UI object to translation UI information of the UI object associated with the animation type of another UI mode among the plurality of UI modes, the at least one other property of the UI object for displaying the UI object according to the animation type of the another UI mode
a storage unit that stores the translation UI information; and
a display unit that displays the UI object based on the stored translation information after the UI mode is selected.

14. The apparatus of claim 13, further comprising:
a physics animation controller that extracts UI information to display the UI object in the physics animation mode; and
a non-physics animation controller that extracts UI information to display the UI object in the non-physics animation mode.

15. The apparatus of claim 13, wherein, if the current UI mode is the non-physics animation mode, the animation type comprises at least one of a translation type, a rotation type, a scale type, an alpha variation type, and a shape modification type, and
if the current UI mode is the physics animation mode, the animation type comprises at least one of the alpha variation type and the shape modification type.

16. The apparatus of claim 15, wherein, if the current UI mode is the non-physics animation mode and the animation type is the translation type, the at least one property comprises non-physical UI elements and the UI information extraction unit extracts the non-physical elements, the non-physical UI elements comprising a location and a time when the UI object starts to move and a location and time when the UI object stops moving, and
the UI information translation unit translates the current UI information to physical UI elements, the physical UI elements comprising a force, an acceleration, a linear velocity, and a motion vector of the UI object.

17. The apparatus of claim 15, wherein, if the current UI mode is the non-physics animation mode and the animation type is the rotation type, the at least one property comprises non-physical UI elements and the UI information extraction unit extracts the non-physical UI elements, the non-physical UI elements comprising an angle of rotation of the UI object per unit time, and
the UI information translation unit translates the current UI information to physical UI elements, the physical UI elements comprising a torque, an angular velocity, and a motion vector of the UI object.

18. The apparatus of claim 15, wherein, if the current UI mode is the non-physics animation mode and the animation type is the scale type, the at least one property comprises non-physical UI elements and the UI information extraction unit extracts the non-physical UI elements, the non-physical UI elements comprising a variation in size of the UI object, and
the UI information translation unit translates the current UI information to physical UI elements, the physical UI elements comprising a mass and a collision shape of the UI object.

19. The apparatus of claim 15, wherein, if the current UI mode is the non-physics animation mode and the animation type is the alpha variation type, the at least one property comprises non-physical UI elements and the UI information extraction unit extracts the non-physical UI elements, the non-physical UI elements comprising a transparency, a location, and a size of the UI object, and
the UI information translation unit translates the current UI information to physical UI elements, the physical UI elements comprising whether the UI object is visible, a location, a mass, and a collision shape of the UI object.

20. The apparatus of claim 15, wherein, if the current UI mode is the non-physics animation mode and the animation type is the shape modification type, the at least one property comprises non-physical UI elements and the UI information extraction unit extracts the non-physical UI elements, the non-physical UI elements comprising a shape of the UI object, a location and a time when the UI object starts to move, and a location and a time when the UI object stops moving, and
the UI information translation unit translates the current UI information to physical UI elements, the physical UI elements comprising a shape, a linear velocity, and a motion vector of the UI object.

21. The apparatus of claim 15, wherein, if the current UI mode is the physics animation mode and the animation type is the alpha variation type, the at least one property comprises physical UI elements and the UI information extraction unit extracts the physical UI elements, the physical UI elements comprising whether the UI object is visible, a location, and a mass of the UI object, and
the UI information translation unit translates the current UI information to non-physical elements, the non-physical UI elements comprising that include a transparency, a location, and a size of the UI object.

22. The apparatus of claim 15, wherein, if the current UI mode is the physics animation mode and the animation type is the shape modification type, the at least one property comprises physical UI elements and the UI information extraction unit extracts the physical UI elements, the physical UI elements comprising a shape of the UI object and an intensity and a direction of force applied to the UI object, and
the UI information translation unit translates the current UI information to non-physical UI elements, the non-physical UI elements comprising an initial shape and location where the UI object is motionless.

23. The apparatus of claim 22, wherein the initial shape of the UI object when the UI object is motionless comprises a modification to the UI object or pieces of the UI object when the UI object is broken.

24. A method of translating an object, which is displayed in a first animation mode on a user interface (UI), into a second object to be displayed in a second animation mode on the UI, the method comprising:

determining a current UI animation mode of the UI from among the first animation mode and the second animation mode;

determining a current animation type of the current UI animation mode;

extracting first UI information of the object, the first UI information associated with the current animation type, the first UI information of the object comprising a property of the object for displaying the object according to the current animation type of the current UI mode;

converting the property of the object of the first UI information of the object to a second property of the object of second UI information of the object, the second UI information associated with a second animation type of the second animation mode, the second property of the object for displaying the object according to the second animation type of the second animation mode; and displaying the object on the UI in the second animation type of the second animation mode using the second UI information at a translated UI animation mode.

25. The method of claim 24, wherein the first animation mode is a physics animation mode and the second animation mode is a non-physics mode.

26. The method of claim 25, wherein the physics animation mode is an animation mode in which laws of physics are applied to the object when the object is displayed and the non-physics mode is an animation mode in which the laws of physics are not applied to the object when the object is displayed.

27. The method of claim 26, wherein the animation type of the physics animation mode comprises at least one of alpha variation type and the shape modification type, and wherein the animation type of the non-physics animation mode comprises at least one of a translation type, a rotation type, a scale type, an alpha variation type, and a shape modification type.

28. The method of claim 27, wherein the property of the object of the UI information of the object in the alpha variation type of the physics animation mode comprises information indicating whether the object is visible, a location, and a mass of the object, and wherein the property of the object of the UI information of the object in the shape modification type of the physics animation mode comprises a shape of the object, an intensity of force applied to the object, and a direction of the force applied to the object.

29. The method of claim 27, wherein the property of the object of the UI information of the object in the translation type of the non-physics animation mode comprises a location where the object begins, a time at which the object starts to move, a location where the object ends, and a time at which the object stops moving, wherein the property of the object of the UI information of the object in the rotation type of the non-physics animation mode comprises an angle of rotation per unit time, wherein the property of the object of the UI information of the object in the scale type of the non-physics animation mode comprises a variation in the size of the object, wherein the property of the object of the UI information of the object in the alpha variation type of the non-physics mode comprises a transparency, a location, and a size of the object, and wherein the property of the object of the UI information of the object in the shape modification type of the non-physics mode comprises a shape of the object, a location where the object begins, a time at which the object starts to move, a location where the object ends, and a time at which the object stops moving.

* * * * *